Nov. 28, 1967    A. T. BASSETT, JR., ETAL    3,355,575
STACKED DISH INFRARED SURFACE HEATING UNIT
Filed Oct. 12, 1965

INVENTORS
Arthur T. Bassett, Jr.
Donald C. Siegla
BY
*J.C. Evans*
Their Attorney

United States Patent Office 3,355,575
Patented Nov. 28, 1967

3,355,575
STACKED DISH INFRARED SURFACE HEATING UNIT
Arthur T. Bassett, Jr., and Donald C. Siegla, Dayton, Ohio, assignors to General Motors Corporation, Detroit, Mich., a corporation of Delaware
Filed Oct. 12, 1965, Ser. No. 495,056
14 Claims. (Cl. 219—464)

ABSTRACT OF THE DISCLOSURE

In preferred form an infrared surface heating unit including an upper utensil supporting plate having a depending stepped skirt, a reflector plate having a depending skirt nested within the stepped skirt on the support plate and defining therewith an infrared resistance element containing chamber, a fixed support member carrying an annular resilient seal received within an annular space between the depending skirts on the nested plates, and an infrared reflective surface on the reflector plate blocking radiant heat transfer from the resistance element to the seal during operation of the unit.

---

This invention is directed to surface heating units and more particularly to surface heating units of the infrared type.

In surface heating units for association with cooking tops, ranges and the like, it is desirable to use a heating element that is energizable into the infrared range to transfer energy into a supported utensil. Such units are characterized by a reduced time lag between initial energization of the unit and effective heat transfer therefrom to a supported utensil.

Furthermore, infrared type surface heating units are characterized by the provision therein of a flat continuous utensil supporting plate that is adapted to be located in good heat transfer contact with a wide range of various cooking utensils even in cases where the flat bottom surface of a utensil might be substantially bent or warped. An example of a typical infrared surface heating unit including such characteristics is set forth in United States Patent No. 2,859,368.

One problem with many infrared surface heating units, however, is that the utensil supporting plate thereof has a substantial temperature gradient thereacross due in part to the relationship of the infrared emissive element therein to the plate. In certain regions of the plate, the temperature level that results from energy emissions from the infrared emissive resistance element is sufficient to self-clean soil or spillover deposited therein; in other regions the temperature of the plate is below the self-cleaning temperature. For example, at the outer peripheral edge of certain plates soil deposited thereon, rather than being removed by the temperature of the heated plate is retained on the plate as a hard black deposit or varnish that is very difficult to remove and extremely unsightly.

Accordingly, an object of the present invention is to improve infrared type surface heating units by the provision of a utensil supporting plate configuration that has the full exposed planar extent thereof self-heated by infrared energy absorption to remove soil deposited thereon through thermal degradation.

A further object of the present invention is to improve infrared type surface heating units by the provision therein of an improved utensil supporting plate member and reflector member that are formed to locate a resilient shock absorbing member of the unit out of radiant heat transfer relationship with a high temperature resistance element in the unit and wherein the means for thermally isolating the shock absorber member includes means for exposing the full planar extent of the utensil supporting member with respect to the resistance element so that the exposed portion of the support member is heated sufficiently to remove soil deposits therefrom.

Still another object of the present invention is to improve infrared surface heating units by the provision therein of a plurality of dished members located in nested relationship to form an enclosure for a high temperature electrically energizable resistance element and wherein the nested dished members have spaced apart depending peripheral flanges thereon forming an opening into the resistance element containing enclosure that is sealed by an annular resilient seal member which, in turn, is supportingly received by a support member for resiliently absorbing shock loadings directed onto a utensil supporting portion of the dished nested members.

Further objects and advantages of the present invention will be apparent from the following description, reference being had to the accompanying drawings wherein a preferred embodiment of the present invention is clearly shown.

In the drawings:

FIGURE 1 is a view in perspective of a domestic electrical range including a surface heating unit of the present invention; and FIGURE 2 is an enlarged view in vertical section taken along the line 2—2 of FIGURE 1.

Referring to the drawings, in FIGURE 1 a domestic range 10 is illustrated including a top 12 having a plurality of openings 14 therein. In each of the openings is located an infrared surface heating unit 16 including the features of the present invention. In the illustrated arrangement the range is representatively shown as including a rearwardly located control panel 18 having a plurality of controllers 20 thereon for controlling the operation of each of the units 16.

The unit 16 more particularly is set forth in FIGURE 2 as including an upper utensil supporting member 22 formed from a high strength infrared transmissive material such as quartz, a high silica glass such as Vycor, made by Corning Glass, or a recrystallized glass ceramic such as Cer-Vit, manufactured by Owens-Illinois.

The member 22 is characterized further as having a utensil supporting portion represented as a flat plate 24 extending across substantially the full planar extent of the opening 14 in the top 12.

The flat plate portion 24 has a stepped, depending flange or skirt 26 formed completely around the periphery thereof which has an outer peripheral step or groove 28 formed completely therearound and an inner peripheral step or groove 30 therein formed completely therearound.

The member 22 thereby has a dished form and as illustrated in FIGURE 2 is inverted within the opening 14 so that the flat surface 24 thereon is raised a slight extent above the top 12 to define a utensil supporting region thereon.

Within the member 22 is located a reflector member 32 that includes a flat surface portion 34 and a peripheral flange or skirt portion 36 depending therefrom whereby the reflector member 32 has a dished form like that of member 22. The member 32 is nested within the member 22 whereby the flat surface portion 34 of the member 32 is located in spaced relationship with the flat surface portion 24 of member 22 to form an energy element containing space 38 therebetween. The internal groove 30 in the flange 26 maintains the spacing between the flat surface portions 24 and 34 of the members 22 and 32 by engaging the outer peripheral edge of the member 32 above the depending flange 36 thereon. Furthermore, the flange 26 is located radially inwardly of the flange 26 to form a space 40 between the flanges 26, 36 that constitutes an inlet opening into the space 38 between the members 22, 32. In the illustrated arrangement the nested members 22, 32 are supportingly received on an annular resilient member 42, for example, a silicone rubber element that is supportingly received on an inwardly turned edge 44 of a support ring 46 located within the opening 14 and supportingly received by the top 12 at an upper edge portion 47 thereon and secured thereto by suitable fastening means. The member 42 engages the continuously formed edges of the base of each of the flanges 26, 36, as best seen in FIGURE 2 and thereby serves as a seal to prevent the entrance of foreign matter into the space 38 between the members 22, 32 and, furthermore, serves as a resilient shock absorber to absorb shock loadings directed against the utensil supporting member 22 of the unit 16. The member 22 is secured to the support ring 46 by a bent upper edge of a clamp ring 48 that is bent outwardly at 49 into interlocking engagement with support ring 46. A trim ring 51 surrounds member 22 to cover support ring 46 and clamp ring 48.

Within the space 38 is located a high temperature electrically energizable resistance element 50 representatively shown as having a ribbon configured cross section. The element 50 is disposed across substantially the full planar extent of the flat plate portion 24 of the member 22. The planar disposition of the resistance element 50 can take many forms, one of which is illustrated in our copending United States application, Ser. No. 466,659, filed June 24, 1965. It is important to note, however, that the resistance element is disposed in close spaced relationship with surface portion 24 adjacent the full exposed extent of the member 22.

The filament 50 is supported by a plurality of spider arms, two of which are shown at 52, 54 in FIGURE 2. The spider arms 52, 54 have a plurality of grooves 56 therein which allow for expansion of the element 50. The spider support of the filament 50 prevents undesirable sagging thereof and, furthermore, locates the resistance element 50 out of direct heat transfer contact with the members 22, 32. The spider is merely representative of one suitable form of an arrangement for supporting the element 50 with respect to the members 22 and 32 out of direct heat transfer contact therewith and through the full planar extent of the member 22. For a further explanation of the spider support, reference may be had to our above cited copending application, with it being understood that the details of the support form no part of the present invention.

The support arms 52, 54 locate the coil 50 above a surface 56 on the flat portion 34 of member 32 which is formed of a suitable infrared radiation reflective material as, for example vapor deposited gold.

The flat portion 34 of the member 32 includes a vent opening 58 therethrough that allows for thermal expansion of the atmosphere in the space 38 between the members 22 and 32.

One feature of the above illustrated arrangement is that the annular resilient member 42 will prevent the entrance of grease or like foreign matter into the space 38 that might undesirably coat the reflective surface 56 therein to reduce the transfer of infrared radiation from the resistance element 50 thence through the member 22.

Another feature of the illustrated arrangement is that temperature gradients in the exposed portions of the member 22 are reduced. By virtue of the location of the resistance element 50 in close but spaced proximity to the exposed portion of the member 22, the member is radiantly heated by absorbing infrared radiation energy from element 50 to temperature levels where soil and spillage that are deposited thereon are removed by thermal degradation whereby the unit is self-cleaned at points where it is located above the top 12 and the surrounding trim ring 51.

The member 22 will have a portion thereon which is located out of close proximity with the resistance element 50 that has a temperature which is below that temperature which will self-clean soil from the member 22. This region, however, occurs in the illustrated arrangement beneath the snap ring 48 that holds the upper utensil member 22 against the annular shock absorbing member 42 and is also covered by trim ring 51 to be unobservable from the top of the unit 16.

Additionally, the flanges 26, 36 locate the opening 40 to the space 38 a substantial distance from the resistance element 50 out of direct infrared radiant heat transfer relationship therewith and the conductive heat transfer through the flanges 26, 36 is such that the temperature increase at the annular resilient member 42 is minimized whereby a silicone rubber or the like will retain resiliency over a substantial period of operation of the unit 16 to retain its shock absorbing characteristics and, furthermore, to continually maintain a good sealing contact with the flanges 26, 36 to prevent the entrance of grease vapors or the like into the space 38 through the opening between the flanges 26, 36.

Furthermore, by nesting the dished utensil supporting member 22 and reflector member 32, the unit 16 retains a low profile readily adapted for use in many present-day range units and cooking surface arrangements.

While the embodiment of the present invention as herein disclosed constitutes a preferred form, it is to be understood that other forms might be adopted.

What is claimed is as follows:

1. In an infrared surface heating unit, the combination of, a first dished member having a planar extent forming a utensil supporting surface, said first dished member having a peripheral flange formed continuously around said planar extent in depending relationship therewith and including a lower edge formed continuously around the base of said flange, a second dished member nested within said first dished member having a planar extent located in spaced relationship with said planar extent of said first member, an infrared reflective surface on said planar extent of said second member, said second member having a peripheral flange surrounding said planar extent of said second member in depending relationship therewith and including an edge on the base thereof continuously around said flange, said peripheral flange in said second dished member being located inwardly of said peripheral flange on said first member, said first and second flanges forming an annular space extending downwardly from said planar extent of said second dished member, means for supporting said first and second dished members including a seal ring located between said flanges and in contact with the continuously formed edges on the base of said flanges for preventing the entrance of foreign matter interiorly of the space between said depending flanges of said nested dish-shaped members.

2. In the combination of claim 1, an energizable high-temperature electrical resistance element located between said planar extents of said dish-shaped members, means for supporting said resistance element in spaced relationship with said dished members for reducing direct conductive heat transfer between said element and said dished members, means including said infrared reflective surface for maintaining said seal member out of direct radiant heat transfer relationship with said resistance element for maintaining said seal element at a reduced temperature level as compared to the temperature of the planar extents of said dished members.

3. In an infrared surface heating unit, the combination of, a fixed support member, an annular resilient member supportingly received by said support member, a pair of dished members, one of said members having an outer peripheral flange thereon depending toward said fixed support member and a planar extent bounded by said peripheral flange for forming a utensil supporting surface at a point above said fixed support member, another of said dished members including a peripheral flange depending toward said fixed support and located interiorly of said peripheral flange of said first member, said other dished member including a planar extent bounded by said peripheral flange thereof, said planar extent of said other member being located in spaced relationship with said planar extent of said one of said members, said annular seal member supportingly receiving said peripheral flanges for absorbing shock loadings imposed upon said first planar extent of said one member.

4. In the combination of claim 3, a high temperature electrically energizable resistance element located in the space between said planar extents, said resistance element underlying substantially the full planar extent of said utensil supporting surface for raising the temperature thereof to remove soil therefrom by heat cleaning, said planar extent of said another dished member having an infrared reflective surface thereon shielding said depending flanges on said pair of dished members from said high temperature resistance element for maintaining said flanges at a reduced temperature to prevent excessive thermal degradation of said annular seal member by maintaining a thermal gradient in said one of said dished members whereby when said planar extent of said one of said dished members is at a temperature sufficiently elevated for self-cleaning said depending flanges, at said annular seal member are below a self-cleaning temperature.

5. In the combination of claim 4, said peripheral flanges having a thin-sectioned form to minimize conductive heat transfer from said resistance element to said seal member.

6. In the combination of claim 4, said means for supporting said resistance element in said space between said nested dished members including means for reducing conductive heat transfer between said dished members and said resistance element whereby the energy input to said resistance element is directed therefrom primarily as radiant heat energy.

7. In the combination of claim 4, said peripheral flanges being spaced from one another to form an annular opening into the space between said nested dished members, said annular seal member being disposed in said opening to prevent the entrance of foreign matter into the space between said nested dished members.

8. In the combination of claim 4, said one of said dished members being formed of infrared transmissive material, said other of said dished members having an infrared transmissive surface thereon underlying substantially the full planar extent of said one of said dished members.

9. In the combination of claim 4, said other of said dished members having an opening therein for communicating the space between said members with atmosphere for venting the space therein during thermal heating of air in said space.

10. In an infrared surface heating unit comprising, an upper utensil supporting member including a flat surface portion and a depending flange on said flat surface portion located in surrounding relationship therewith, a reflector plate located within said depending flange including a flat surface portion in spaced relationship with the flat surface portion on said utensil supporting member, a depending flange on said reflector plate formed continuously around the periphery thereof, said reflector plate flange defining a downwardly facing annular space below said flat surface of said reflector plate, being located in spaced relationship and inwardly of said utensil supporting plate flange, a fixed support having an opening therein, means for locating said utensil supporting plate in said opening, said means including a resilient member supportingly received by said fixed support for absorbing shock loadings on said utensil supporting member and for sealing the space between said flanges.

11. In the combination of claim 10, a high-temperature electrically energizable resistance element located in the space between said flat surface portions and disposed across substantially the full planar extent of said flat surface portion of said utensil supporting member, said resistance element being energizable to direct radiant energy through said supporting member for raising the temperature thereof sufficiently to self-clean the full planar extent of said flat surface portion thereof, said flanges locating said resilient member out of direct heat transfer relationship with said resistance element to minimize the temperature increase of said resilient member during the operation of the surface heating unit.

12. In the combination of claim 10, said utensil supporting plate being formed of infrared transmissive material, said reflector plate including a surface of infrared reflective material for directing a portion of the radiant energy output from said resistance element through said utensil supporting plate.

13. In the combination of claim 11, means for supporting said resistance element in said space between said flat surface portions including means for reducing heat transfer between said resistance element and said utensil supporting member by conductive heat transfer whereby the energy input to said resistance element is directed primarily therefrom as radiant heat energy.

14. In the combination of claim 12, a high-temperature electrically energizable resistance element located in the space between said flat surfaces disposed across substantially the full planar extent of said flat surface portion of said utensil supporting member, said resistance element being energizable to direct radiant energy through said supporting member for raising the temperature thereof sufficiently to self-clean the full planar extent of said flat surface portion thereof, said flanges locating said resilient member out of direct heat transfer relationship with said resistance element to minimize the temeprature increase of said resilient member during the operation of the surface heating unit.

References Cited

UNITED STATES PATENTS

| 2,179,934 | 11/1939 | Jones | 219—538 |
| 2,570,975 | 10/1951 | Osterheld | 219—468 X |
| 2,799,765 | 7/1957 | Jenkins et al. | 219—464 X |
| 2,870,316 | 1/1959 | Ferguson | 219—464 X |

RICHARD M. WOOD, *Primary Examiner.*

L. H. BENDER, *Assistant Examiner.*

UNITED STATES PATENT OFFICE
CERTIFICATE OF CORRECTION

Patent No. 3,355,575                      November 28, 1967

Arthur T. Bassett, Jr., et al.

It is hereby certified that error appears in the above numbered patent requiring correction and that the said Letters Patent should read as corrected below.

Column 3, line 9, for "of", first occurrence, read -- on --; column 6, lines 2 to 4, strike out "defining a downwardly facing annular space below said flat surface of said reflector plate," and insert the same after "flange" in line 5, same column 6; line 48, for "temeprature" read -- temperature --.

Signed and sealed this 18th day of March 1969.

(SEAL)
Attest:

Edward M. Fletcher, Jr.                      EDWARD J. BRENNER
Attesting Officer                              Commissioner of Patents